(12) United States Patent
Haug et al.

(10) Patent No.: US 9,790,985 B2
(45) Date of Patent: Oct. 17, 2017

(54) PIVOTING FITTING

(71) Applicant: Hettich Franke GmbH & Co. KG, Balingen-Weilstetten (DE)

(72) Inventors: Ernst Haug, Balingen (DE); Gerd Stauβ, Winterlingen (DE); Steffen Grathwol, Balingen (DE)

(73) Assignee: Hettich Franke GmbH & Co. KG, Balingen-Weilstetten (DE)

( * ) Notice: Subject to any disclaimer, the term of this patent is extended or adjusted under 35 U.S.C. 154(b) by 0 days.

(21) Appl. No.: 14/910,880

(22) PCT Filed: Jul. 31, 2014

(86) PCT No.: PCT/EP2014/066554
§ 371 (c)(1),
(2) Date: Feb. 8, 2016

(87) PCT Pub. No.: WO2015/018744
PCT Pub. Date: Feb. 12, 2015

(65) Prior Publication Data
US 2016/0348713 A1    Dec. 1, 2016

(30) Foreign Application Priority Data
Aug. 9, 2013   (DE) .................. 10 2013 108 665

(51) Int. Cl.
*F16C 11/10*   (2006.01)
*A47C 1/026*   (2006.01)
(Continued)

(52) U.S. Cl.
CPC .............. *F16C 11/10* (2013.01); *A47C 1/026* (2013.01); *A47C 7/38* (2013.01); *A47C 7/54* (2013.01); *B60N 2/235* (2013.01)

(58) Field of Classification Search
CPC ......... F16C 11/04; F16C 11/045; F16C 11/10; F16C 11/103; F16C 11/12; A47C 1/026;
(Continued)

(56) References Cited

U.S. PATENT DOCUMENTS 4,143,905 A * 3/1979 Hensel ................... B60N 2/433
                                                              280/650
4,435,013 A   3/1984 Arihara
(Continued)

FOREIGN PATENT DOCUMENTS

DE         19928148 A1 * 1/2001 ............. B60N 2/235
DE   WO 2007088128 A1 * 8/2007 ............. A47C 1/026
(Continued)

OTHER PUBLICATIONS

Machine translation of EP 1284447 A1 obtained on Mar. 7, 2017.*
International Search Report Form PCT/ISA/237, International Application No. PCT/EP2014/066554, pp. 1-5, dated Oct. 13, 2014.

*Primary Examiner* — Adam D Rogers
(74) *Attorney, Agent, or Firm* — Bond Schoeneck & King, PLLC; David Nocilly

(57) ABSTRACT

A pivoting fitting (1) comprises a first tab (2) and a second tab (3) which are mounted so as to be rotatable relative to each other about an axis (6), and a locking mechanism having at least one pawl (5) and toothing (4), wherein the pawl (5) can be engaged in the toothing in a plurality of positions and permits a pivoting movement of the first tab (2) with respect to the second tab (3) in a first direction and blocks movement in an opposing direction, and wherein at least one control element (14) is provided to disengage the at least one pawl (5) from the toothing (4) and then to pivot the first tab (2) with respect to the second tab (3) in the second direction through an angle, wherein the at least one pawl (5) is retained by a spring element (9) in a position engaged in the toothing (4), wherein the spring element (9)

(Continued)

is at least partially made from an elastomer material. In this way, the pivoting fitting (1) can be pivoted with little noise.

11 Claims, 6 Drawing Sheets

(51) Int. Cl.
  *B60N 2/235* (2006.01)
  *A47C 7/38* (2006.01)
  *A47C 7/54* (2006.01)

(58) Field of Classification Search
  CPC ....... A47C 7/38; A47C 7/54; F16H 2061/243; G05G 5/08; G05G 5/14; G05G 5/18; G05G 5/24; G05G 2700/06; G05G 2700/08; B60N 2/235
  See application file for complete search history.

(56) References Cited

U.S. PATENT DOCUMENTS

| | | | | |
|---|---|---|---|---|
| 6,325,458 | B1 * | 12/2001 | Rohee | B60N 2/236 297/367 R |
| 6,695,296 | B1 * | 2/2004 | Runge | F16F 1/373 248/628 |
| 7,100,987 | B2 * | 9/2006 | Volker | B60N 2/236 297/367 R |
| 7,566,099 | B2 * | 7/2009 | Catanzarite | A47C 1/026 297/361.1 |
| 7,967,385 | B2 * | 6/2011 | Cillierre | B60N 2/2356 297/216.13 |
| 8,262,068 | B1 * | 9/2012 | Monson | F16F 1/373 267/160 |
| 8,720,999 | B2 * | 5/2014 | Peters | B60N 2/2356 297/367 L |
| 8,931,843 | B2 * | 1/2015 | Schuler | B60N 2/2252 297/367 R |
| 9,296,315 | B2 * | 3/2016 | Hellrung | B60N 2/2356 |
| 9,387,782 | B2 * | 7/2016 | Boisgontier | B60N 2/235 |
| 9,481,270 | B2 * | 11/2016 | Peters | B60N 2/2356 |
| 2008/0173211 | A1 * | 7/2008 | Kennedy | B61F 5/142 105/199.3 |
| 2013/0011181 | A1 * | 1/2013 | Riedmueller | A47C 1/026 403/84 |
| 2014/0333114 | A1 * | 11/2014 | Peters | C23C 14/06 297/463.1 |

FOREIGN PATENT DOCUMENTS

| | | |
|---|---|---|
| EP | 1 284 447 | 2/2003 |
| FR | 2 626 154 | 7/1989 |

* cited by examiner

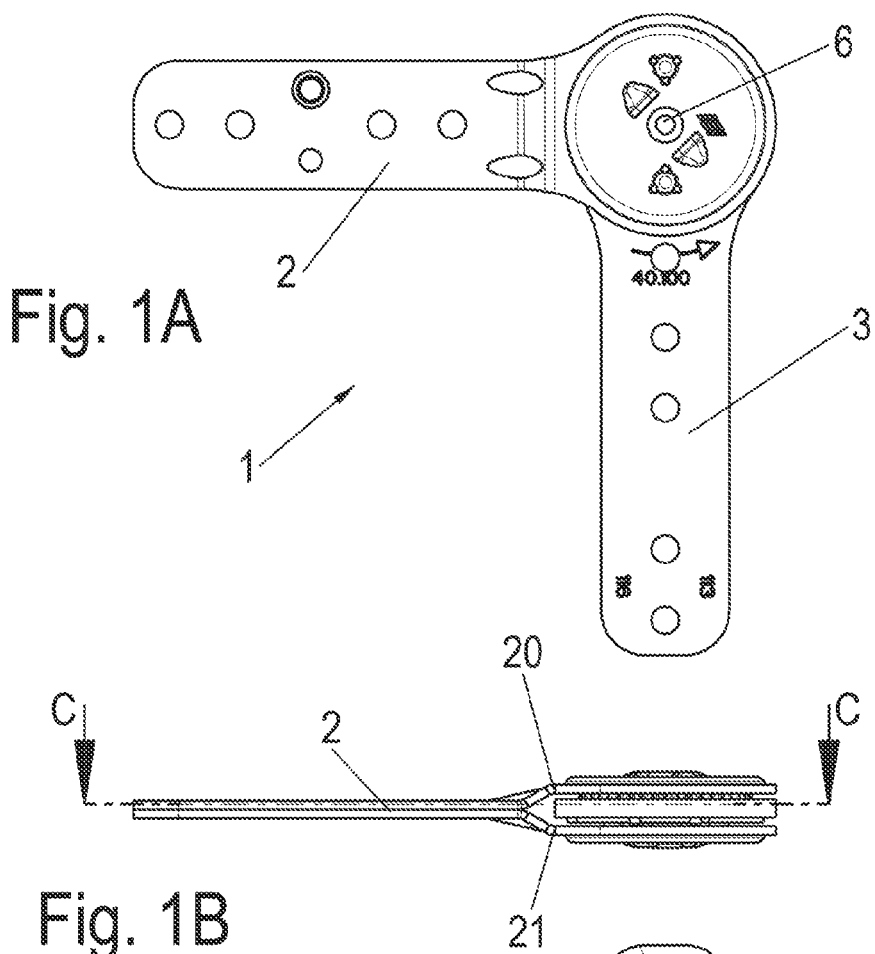
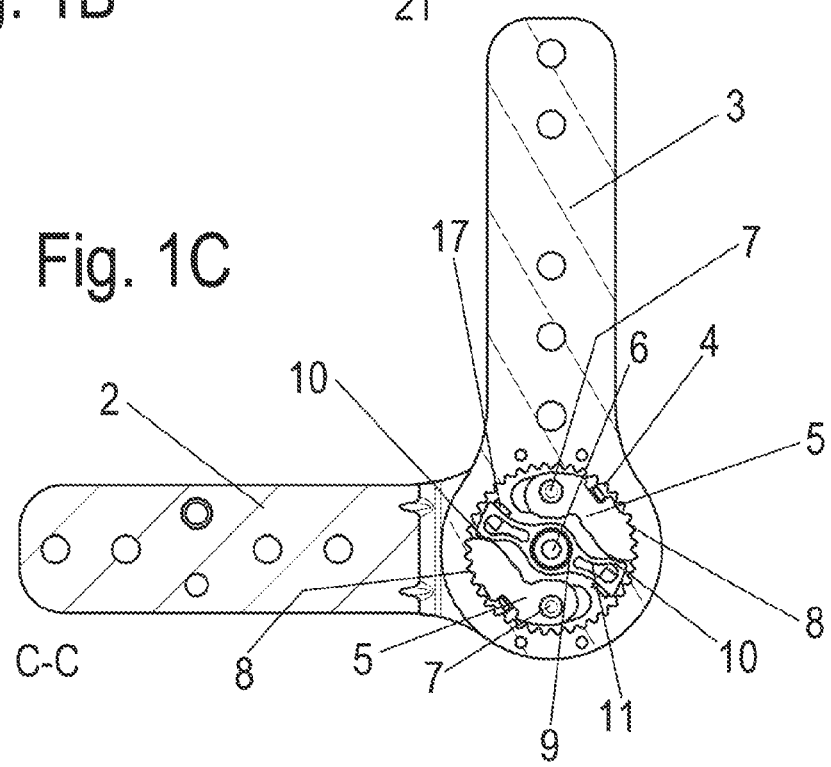

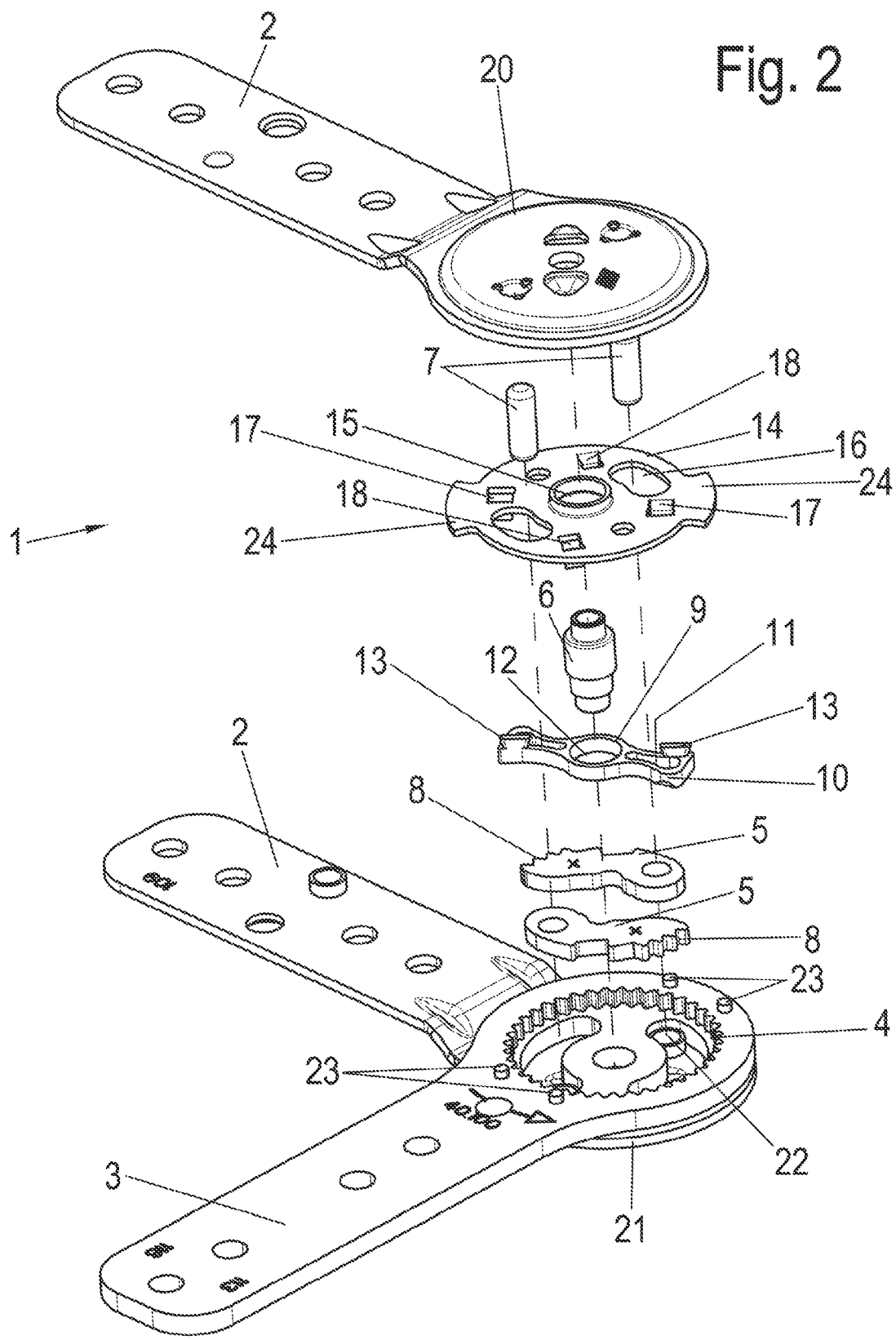

PIVOTING FITTING

BACKGROUND OF THE INVENTION (1) Field of the Invention

The present invention relates to a pivoting fitting with a first tab and a second tab which are mounted so as to be rotatable relative to each other about a shaft, and a locking mechanism having at least one pawl and a toothing.

(2) Description of the Related Art

EP 1 284 447 discloses a pivoting fitting, in which a first tab can be pivoted relative to a second tab, wherein the tabs can be held on each other at a predetermined angular position by a latching or locking mechanism. The locking mechanism comprises two pawls which are pivotably mounted and are in engagement with a toothing via a spring element. The metallic spring element presses the pawls into the toothing and can be compressed in order to lift the pawls out of the toothing via a cam disc and to then pivot the tabs to an initial position. It is disadvantageous in this pivoting fitting that the latching of the pawls occurs in a comparatively loud way because the metallic spring presses the pawls with high force against the toothing, thus producing loud latching noises during the pivoting of the tabs which are perceived as disturbing.

SUMMARY OF THE INVENTION

It is therefore the object of the present invention to provide a pivoting fitting which enables low-noise latching of the locking mechanism during the twisting of the first tab relative to the second tab.

This object is achieved by a pivoting fitting with a first tab and a second tab which are mounted so as to be rotatable relative to each other about a shaft, and a locking mechanism having at least one pawl and a toothing, wherein the pawl can be latched in the toothing in a plurality of positions and permits a pivoting movement of the first tab with respect to the second tab in a first direction and blocks movement in an opposing second direction, and wherein at least one control element is provided in order to disengage the at least one pawl from the toothing, and then to pivot the first tab with respect to the second tab in the second direction through an angle, wherein the at least one pawl is retained by a spring element in a position engaged in the toothing, characterized in that the spring element is at least partly made from an elastomer material.

In accordance with the invention, the spring element for retaining the pawls in a latched position is made at least partly from an elastomer material. As a result, the spring forces can be arranged in a considerably lower manner than in a metallic spring element, which for reasons of tolerance compensation alone presses the pawls with a specific spring force to the latched position in order to ensure functional reliability of the locking or latching mechanism. This increases the latching noises during the pivoting of the tabs however, especially when the pawls are also made of a metallic material. The latching noises can be reduced considerably by the lower spring forces and the noise damping of the elastomer material during the pivoting of the first and the second tab.

In accordance with a preferred embodiment of the invention, a contact surface of the spring element, which rests on at least one pawl, consists of an elastomer material. The contact surface can be arranged adjacent to the toothing in order to provide good lever conditions.

The spring element is preferably made as a shaped body from an elastomer material. Synthetic materials, rubber mixtures or other elastic materials can be considered as materials for the spring element. An elastomer material with a Shore hardness of between 40 and 110, especially 60 to 90, more preferably between 70 and 85, is preferably used.

In order to keep the loading of the spring element at a low level, the spring element can be pivoted at least in sections with the control element. The spring element can comprise at least one hollow chamber which is surrounded by a flexible web. The flexible web can form a contact surface on the exterior side which rests on the pawl.

The spring element is only able to exert a spring force against the at least one pawl when the pawl is not arranged in a latched position on the toothing. The spring element can thus be set precisely in order to exert spring forces only when the pawl was slightly lifted from the latched position. This reduces the noise development because the pawl is pressed with only little force into the latched position by the spring element. Moreover, the elasticity of the spring element is maintained for a longer period of time in that a setting behaviour of the spring element is substantially avoided.

In accordance with a further embodiment, the control element brings the pawl out of engagement with the toothing in an end position, and the spring element is further relieved in order to then move the at least one pawl to an initial position on the toothing. The spring element is thus not unnecessarily loaded during the changeover of the pawl in order to bring said pawl out of engagement with the toothing. Instead, it can exert a spring force at first on the spring element and is then relieved via the control element. This leads to the advantage that the spring element is not unnecessarily compressed during such a changeover process, which could lead to a loss in the elastic behaviour. In fact, the spring element is relieved again by the control element and is moved back to an initial position. In said initial position, the spring element is tensioned against the pawl, which is then moved to a latched position on the toothing. This reduces the spring forces even during a movement of the at least one pawl from an end position to an initial position.

The control element can be arranged as a cam disc, wherein the spring element is supported with a section on the cam disc. The spring forces of the spring element preferably do not act substantially radially on the pawl, but substantially tangentially on said pawl. As a result, the spring element can be supported by a projection of the cam disc for example in order to exert sufficient spring forces on the pawl.

The pivoting fitting in accordance with the invention is especially used in furniture, e.g. in upholstered furniture, for armrests, headrests or other pivotable components.

BRIEF DESCRIPTION OF THE SEVERAL VIEWS OF THE DRAWINGS

The invention is explained below in closer detail by reference to an embodiment shown in the enclosed drawings, wherein:

FIGS. 1A to 1C show several views of a pivoting fitting in accordance with the invention in a mounted position;

FIG. 2 shows a perspective exploded view of the pivoting fitting of FIG. 1;

DETAILED DESCRIPTION OF THE INVENTION

Figure 3A:
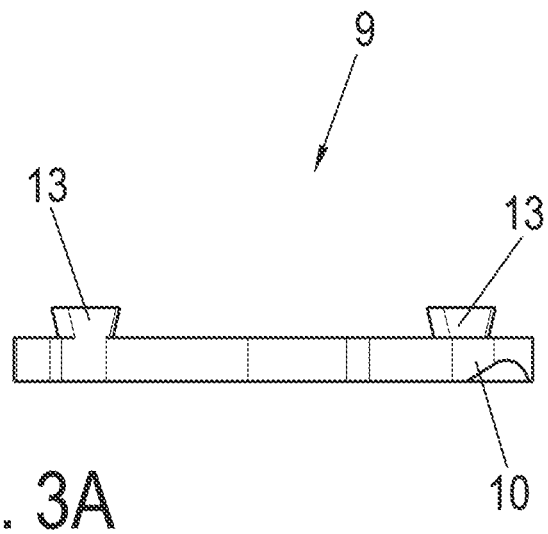
FIGS. 3A and 3B show two views of the spring element of the pivoting fitting of FIG. 1.

A pivoting fitting 1 comprises a first tab 2 and a second tab 3, which are pivotable relative to each other about a shaft 6. The first tab 2 comprises a first part 20 and a second part 21 which are connected to each other on a section protruding radially from the shaft 6 and surround a central region of the second tab 3 in the region of the shaft 6. A locking mechanism or a latching mechanism is provided within the middle region between the first part 20 and the second part 21, which mechanism allows a movement of the first tab 2 relative to the second tab 3 in a first direction and blocks in a second direction. This blockage is lifted in an end position, and the tabs 2 and 3 can be moved back to an initial position.

As is shown in FIG. 1C, the locking mechanism comprises two pawls 5, which are rotatably mounted about a shaft 7. The two shafts 7 are arranged spaced from the central shaft 6 for pivoting the tab. The second tab 3 comprises an annular toothing 4, which faces the shaft 6 and can be brought into engagement with a toothing 8 on each of the pawls 5.

In order to keep the pawls 5 in a latched position, a spring element 9 is provided in form of a shaped body which is made of an elastomer material and is rotatably mounted about the shaft 6. The spring element 9 comprises a contact surface 10 on its radially outer region adjacent to the toothing 4, which contact surface rests on a pawl. The shaped body substantially has the shape of an "8", so that a respective contact surface 10 for acting on a pawl 5 is formed on opposite sides. A projection 17 is provided on the opposite side of the contact surface 10, which projection is arranged on a cam disc. The force on the pawl 5 by the spring element 9 is thus applied substantially tangentially with respect to the shaft 6 or at a lower angle to the tangential, e.g. less than 30°, especially less than 15°.

In FIG. 2, the pivoting fitting 1 is shown in an exploded view. The shaft 6 is held on opposite sides of the tab 2 on the first part 20 and the second part 21, and mounts both the cam disc 14 and also the spring element 9. For this purpose, the spring element 9 comprises a middle opening 12 for leading through the shaft 6. Two hollow chambers and 11 are further provided adjacent the opening 12, which hollow chambers are surrounded by flexible webs. A projection 13 is integrally attached to a flexible web against the contact surface 10, which projection engages in a recess of the cam disc 14 and is supported there on a projection 17. The cam disc 14 comprises a central opening 15 for leading through the shaft 6 and comprises two slots 16, which are penetrated by the shafts 7 on which the pawls 5 are rotatably mounted. The shafts 7 are retained on receivers 22 of the first part 20 and the second part 21. Projections 18 are further formed on the cam disc 14, which projections can be brought into engagement with the pawls 5 in order to release them from the latched position with engagement of the toothing 4 and to move them from an end position back to an initial position.

During pivoting of the first tab 2 relative to the second tab 3, the spring element 9 is substantially only compressed when the pawl 5 is lifted when sliding over the teeth 8 of the toothing 4, i.e. it is moved radially to the inside, so that the spring element 9 presses the pawls 5 back to a latched position. No spring forces, or only very low spring forces, act in the latched position, because the pawls 5 are retained in a self-locking manner in the toothing 4 as seen in the blocking direction. The first tab 2 can thus be pivoted relative to the second tab 3 from an initial position to an end position, where the cam disc 14 is then stopped by a limit stop and the pawls 5 are twisted relative to the cam disc 14. A specific angular path is required for this process. The spring element 9 is compressed equally strongly on the contact surfaces 10 in the first half of the required angular path, as in a conventional switching process in the working region of the pivoting fitting 1. After exceeding half the angular path and a further movement of the first tab 2 relative to the second tab 3, the contact of the contact surfaces 10 to the pawls 5 is interrupted simultaneously with the inward pivoting of the pawls 5, and the spring element 9 is thus relieved. After reaching the end position, the first tab 2 is moved back relative to the second tab 3 from the end position to an initial position, wherein the pawls 5 are kept out of engagement. The mechanism for bringing the pawls 5 out of engagement can occur in different ways, e.g. as described in the document EP 1 284 447.

In the initial position, the spring element 9 is then pressed at first against the pawls 5 in order to then release the pawls 5, so that they can be pivoted radially to the outside again and come into engagement with the toothing 4. As a result, the loading of the spring element 9 during the changeover at the end position or the initial position is reduced to a minimum because the spring element is compressed only briefly. The spring element 9 remains substantially unloaded during the movement of the first tab 2 relative to the second tab 3 from the end position to the initial position. As a result, a setting behaviour of the elastomer material is thus substantially prevented.

Figure 3B:
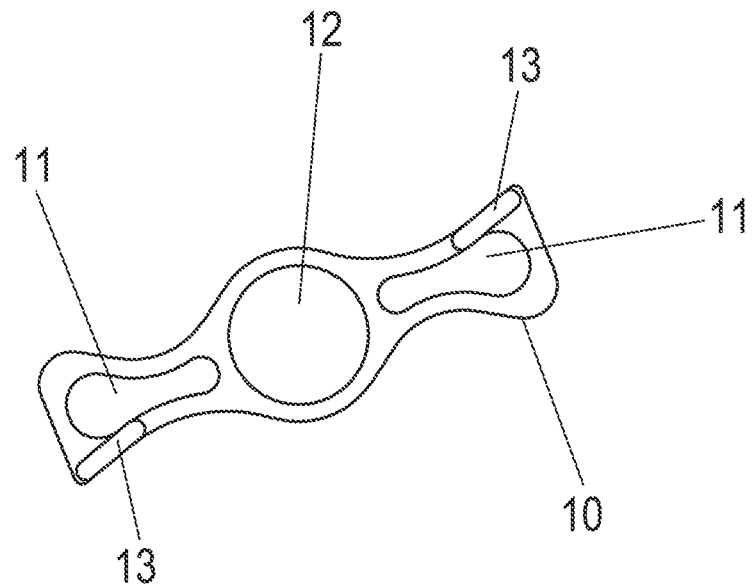

The spring element 9 is shown in closer detail in FIGS. 3A and 3B. The spring element 9 is produced as a shaped body made of an elastomer material, especially rubber or a synthetic material, e.g. foamed synthetic material. The Shore hardness of the material can lie in a range of between 70 and 90 Shore in order to exert sufficient spring forces on the pawls 5 without generating excessive latching noises during the pivoting of the tabs 2 and 3 relative to each other. The shaped body comprises two hollow chambers 11 which are surrounded by flexible webs on which the contact surfaces 10 and the projection 13 are formed. Other shapes of the spring element can be used in order to provide low-noise damping.

Figure 4:
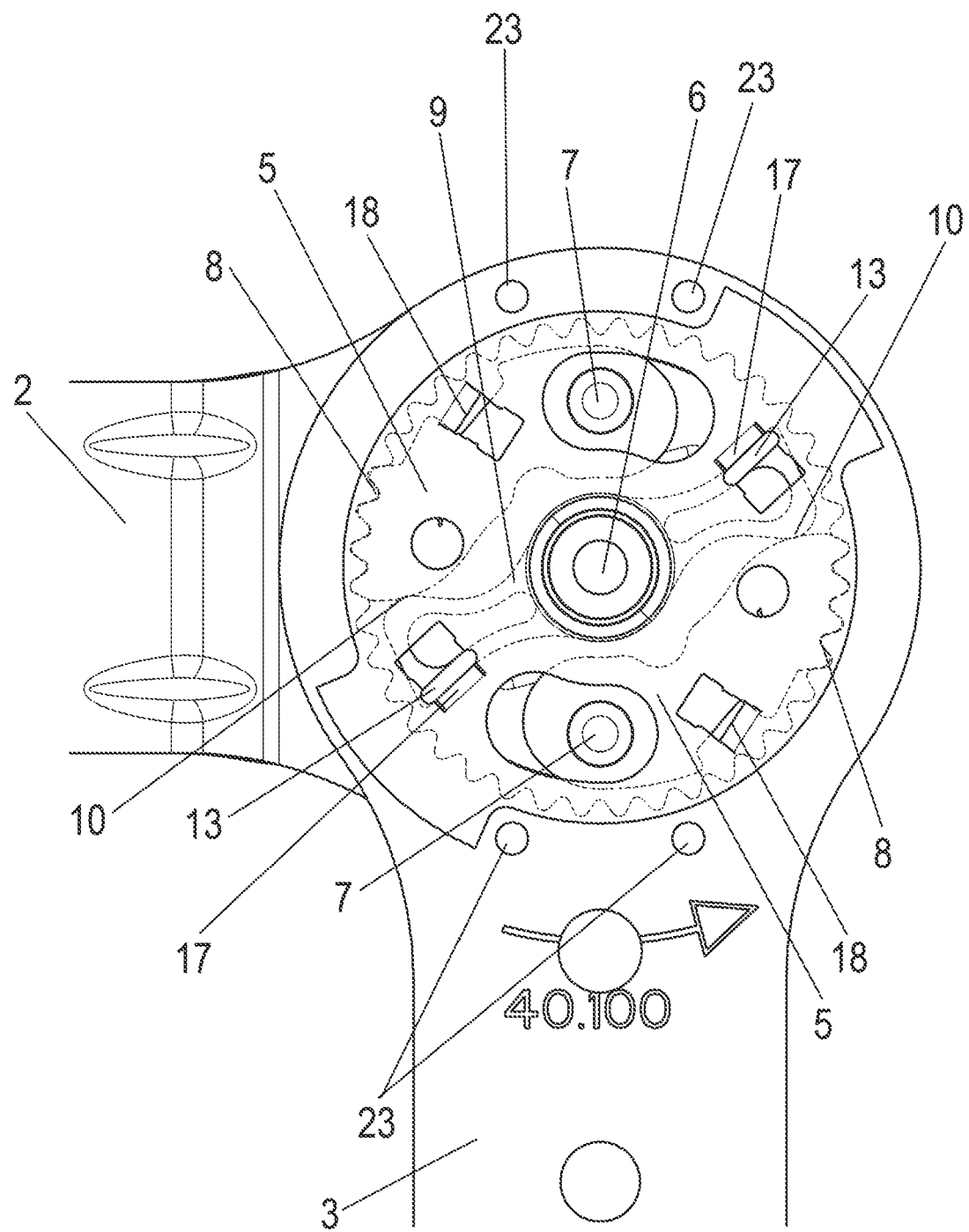
FIG. 4 shows a detailed view of the pivoting fitting of FIG. 1 in an initial position.

FIG. 4 shows the pivoting fitting of FIGS. 1 and 2 in a detailed view in an initial position, wherein a cover for better view was omitted and invisible components were shown by way of a dashed line. The first tab 2 can be twisted from this initial position relative to the second tab 3 about the shaft 6, wherein the pawls 5 are then rotated about the shaft 7 and then latch along the annular toothing 4 on the second tab 3. The spring element 9 rests with the contact surface 10 on the pawls 5 in a region adjacent to the toothing 8. The spring element 9 is supported via the projection 13 on the projection 17 of the cam disc 14.

Figure 6A:
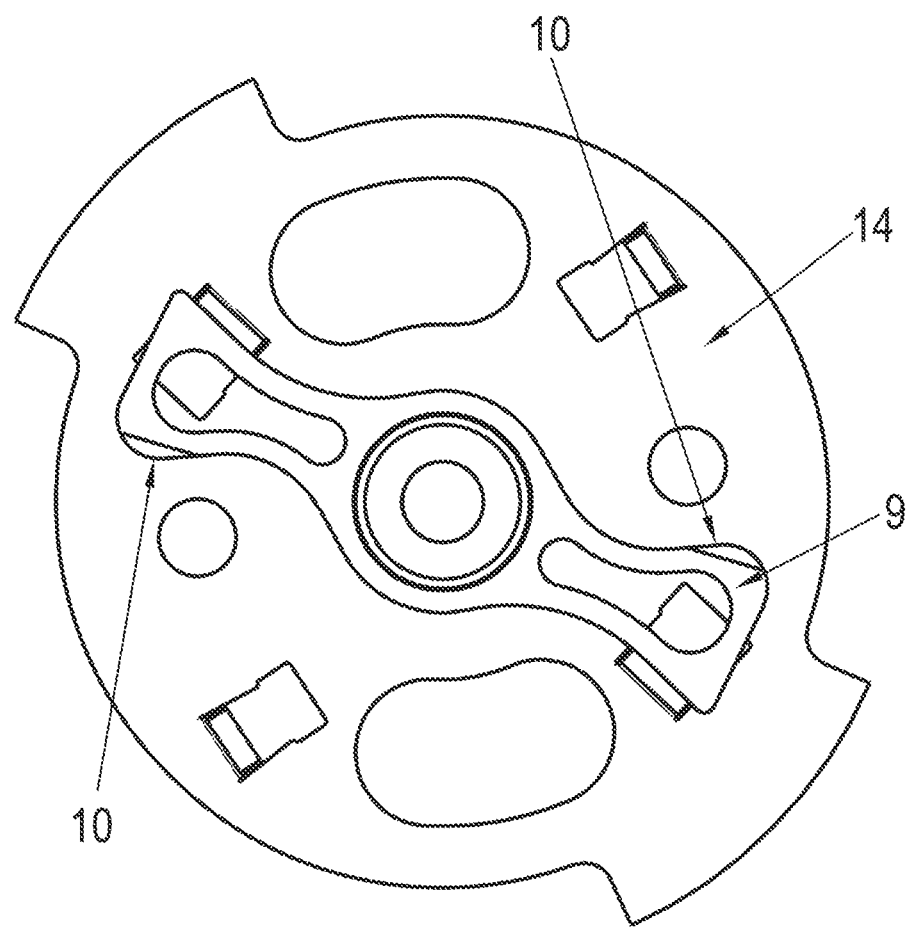
FIG. 6 shows a detailed view of the cam disc with a spring element.
Figure 6B:
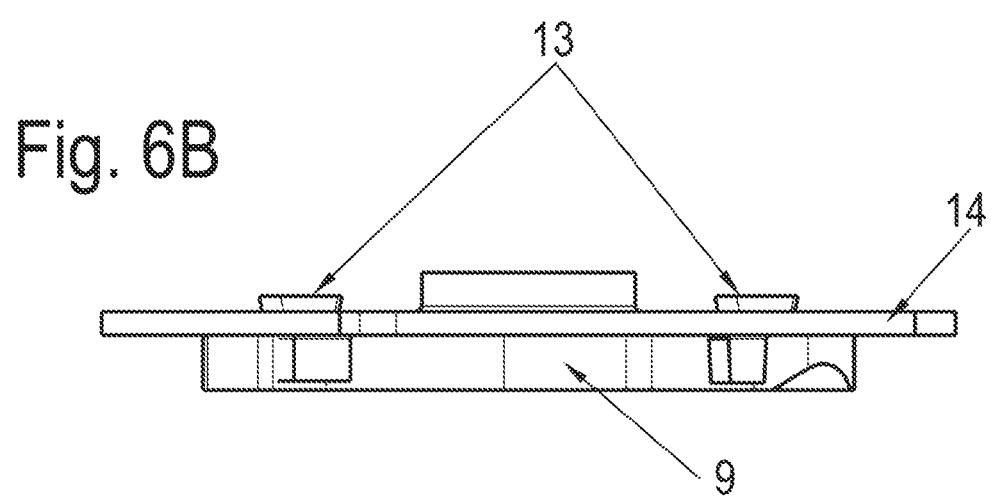

As is shown in FIG. 6, the projection 13 of the spring element 9 is used for suspending the spring element 9 in the recesses of the cam disc 14. In this process, the projection 13 of the spring element 9 fixes the spring element 9 on the cam disc 14 through its shape and prevents axial slippage of the spring element 9 relative to the shaft 6. This fixing also facilitates mounting.

Figure 5:
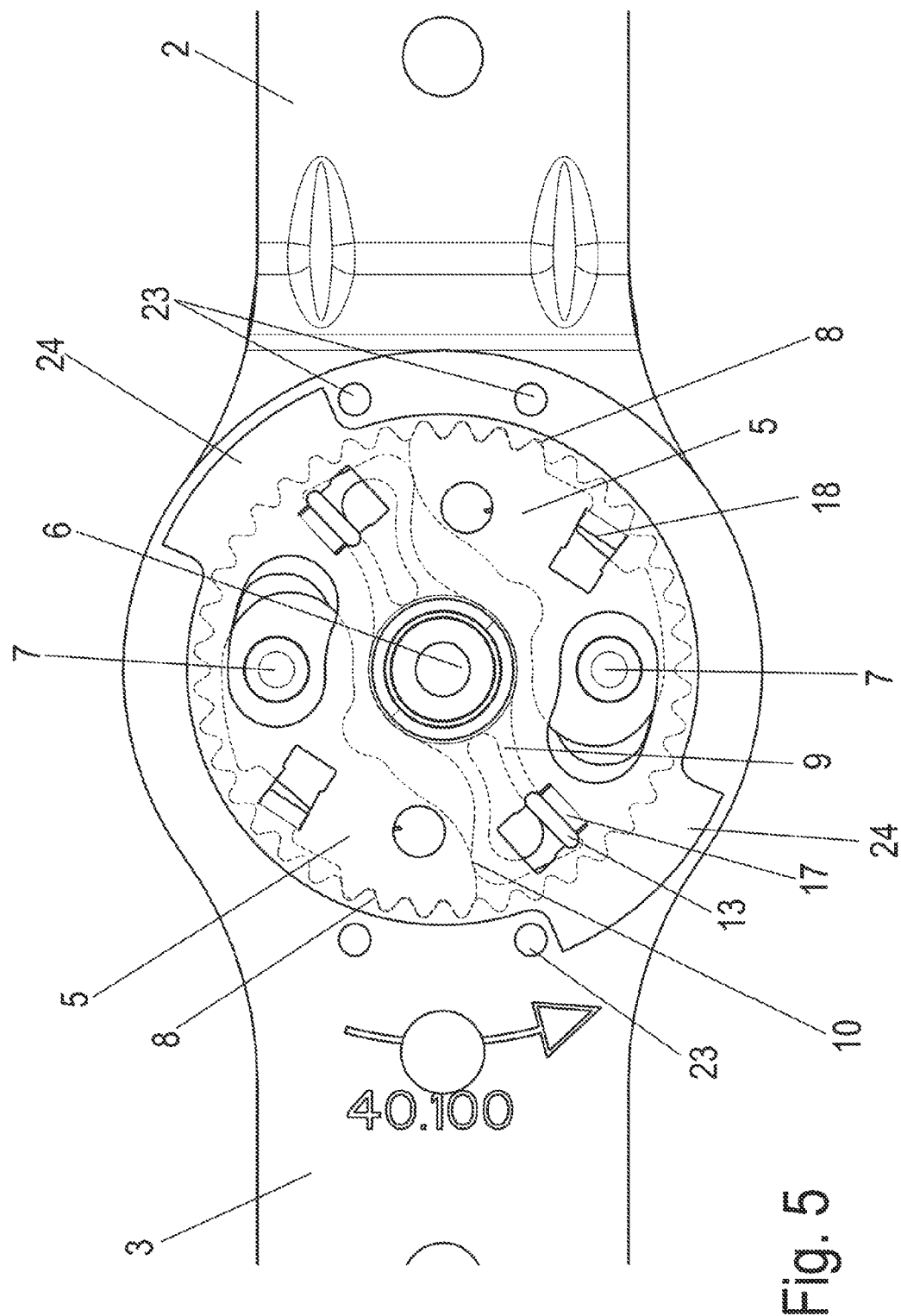
FIG. 5 shows a view of the pivoting fitting of FIG. 1 briefly before a changeover position.

The cam disc 14 rotates together with the first tab 2, so that the radial protruding sections 24 can move toward the stops 23 on the second tab 3. Depending on the arrangement of the stops 23, the pivoting range of the first tab 2 relative to the second tab 3 can be set. As is shown in FIGS. 4 and 5, the tabs 2 and 3 are pivoted about a pivot angle of 90° relative to each other from an initial position to an end position, wherein further pivoting of the tab 2, after reaching the position as shown in FIG. 5, leads to the consequence that as a result of the stops 43 the cam disc 14 ensures that the pawls 5 are lifted from the toothing 8 and the spring element 9 is relieved. For this purpose, the projections 18 act on the pawls 5 and lift them out of a latched position. At the same time, the spring element 9, which is compressed at first, is relieved again. In this position, the tabs 2 and 3 can be moved back to the initial position, which is shown in FIG. 4. During the return movement, a radially protruding section 24 of the cam disc reaches a stop 23 on the second tab 3 and is stopped, so that the projection 18 of the cam disc no longer hold the pawls 5 out of engagement with the toothing 8 and they pivot to a latching position again. At the same time, the spring element 9 is moved back to the initial position shown in FIG. 4, in which the pawls 5 are held or slightly pretensioned in the latched position.

The spring element 9 can also have an enclosed shape instead of the hollow chambers 11. Furthermore, the support of the spring element 9 can also occur by a tab instead of by a projection 13, which tab is bent off from the cam disc 14.

In a further embodiment (not shown), the spring element is integrally formed with the cam disc 14, e.g. produced by a two-component injection moulding method. This reduces the number of components, which simplifies mounting.

Furthermore, the spring element can also be fixed to the pawls or arranged in an integral manner with said pawls. The spring element can be fixed as a soft component to the pawls.

In the illustrated embodiment, the pawls can be latched on a radial inner toothing of the tab 3. Instead of such radial latching, it is also possible to provide axial latching, wherein in this case the toothing is made in an axial direction of the pivoting fitting relative to the shaft 6.

It is further possible to arrange the control element 14 not as a separate component in form of a cam disc, but it can also be provided as a control section on a pawl or the spring element. This can also reduce the number of components on a pivoting fitting.

LIST OF REFERENCE NUMERALS

1 Pivoting fitting
2 Tab
3 Tab
4 Toothing
5 Pawl
6 Shaft
7 Shaft
8 Toothing
9 Spring element
10 Contact surface
11 Hollow chamber
12 Opening
13 Projection
14 Cam disc
15 Opening
16 Slot
17 Projection
18 Projection
20 Part
21 Part
22 Receiver
23 Stop
24 Radially protruding section

The invention claimed is:

1. A pivoting fitting (1), comprising a first tab (2) and a second tab (3) which are mounted so as to be rotatable relative to each other about a shaft (6), and a locking mechanism having at least one pawl (5) and a toothing (4), wherein the at least one pawl (5) can be latched in the toothing (4) in a plurality of positions and permits a pivoting movement of the first tab (2) with respect to the second tab (3) in a first direction and blocks movement in an opposing second direction, and wherein at least one control element (14) is provided in order to disengage the at least one pawl (5) from the toothing (4), and then to pivot the first tab (2) with respect to the second tab (3) in the second direction through an angle, wherein the at least one pawl (5) is retained by a spring element (9) in a position engaged in the toothing (4), characterized in that the spring element (9) is at least partly made from an elastomer material and comprises at least one hollow chamber (11) which is surrounded by a flexible web.

2. A pivoting fitting according to claim 1, characterized in that a contact surface (10) of the spring element (9), which rests on the at least one pawl (5), consists of an elastomer material.

3. A pivoting fitting according to claim 1, characterized in that the spring element (9) is made of an elastomer material.

4. A pivoting fitting according to claim 1, characterized in that the spring element (9) can be pivoted at least in sections with the at least one control element (14).

5. A pivoting fitting according to claim 1, characterized in that the spring element (9) applies a spring force on the at least one pawl (5) when the at least one pawl (5) is not arranged in a latched position on the toothing (4).

6. A pivoting fitting according to claim 1, characterized in that the at least one control element (14) brings the at least one pawl (5) out of engagement with the toothing (4) in an end position, and the spring element (9) is further relieved in order to then move the at least one pawl (5) to an initial position on the toothing (4).

7. A pivoting fitting according to claim 1, characterized in that the elastomer material of the spring element (9) has a Shore hardness of between 40 and 110.

8. A pivoting fitting according to claim 1, characterized in that the at least one control element (14) is arranged as a cam disc, and the spring element (9) is supported with a projection (17) on the cam disc.

9. A pivoting fitting according to claim 1, characterized in that the spring element (9) is arranged integrally with the control element (14) or is fixed to the at least one control element.

10. A piece of furniture with a pivoting fitting (1) according to claim 1.

11. A pivoting fitting (1), comprising a first tab (2) and a second tab (3) which are mounted so as to be rotatable relative to each other about a shaft (6), and a locking mechanism having at least one pawl (5) and a toothing (4), wherein the at least one pawl (5) can be latched in the toothing (4) in a plurality of positions and permits a pivoting movement of the first tab (2) with respect to the second tab (3) in a first direction and blocks movement in an opposing second direction, and wherein at least one control element (14) is provided in order to disengage the at least one pawl (5) from the toothing (4), and then to pivot the first tab (2) with respect to the second tab (3) in the second direction through an angle, wherein the at least one pawl (5) is retained by a spring element (9) in a position engaged in the toothing (4), characterized in that the spring element (9) is at least partly made from an elastomer material, and wherein the at least one control element (14) is arranged as a cam disc, and the spring element (9) is supported with a projection (17) on the cam disc.

\* \* \* \* \*